US009926876B2

(12) United States Patent
Laviola

(10) Patent No.: US 9,926,876 B2
(45) Date of Patent: Mar. 27, 2018

(54) METHOD OF DIAGNOSING A FUEL RAIL PRESSURE SENSOR

(71) Applicant: GM GLOBAL TECHNOLOGY OPERATIONS LLC, Detroit, MI (US)

(72) Inventor: Francesco Laviola, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 187 days.

(21) Appl. No.: 15/172,474

(22) Filed: Jun. 3, 2016

(65) Prior Publication Data

US 2016/0356233 A1 Dec. 8, 2016

(30) Foreign Application Priority Data

Jun. 3, 2015 (GB) .................................. 1509755.3

(51) Int. Cl.
*F02D 41/22* (2006.01)
*F02M 65/00* (2006.01)
*F02D 41/20* (2006.01)

(52) U.S. Cl.
CPC ......... *F02D 41/222* (2013.01); *F02M 65/003* (2013.01); *F02D 2041/2058* (2013.01); *F02D 2041/223* (2013.01); *F02D 2041/228* (2013.01); *F02D 2200/0604* (2013.01); *Y02T 10/40* (2013.01)

(58) Field of Classification Search
CPC ............. F02D 41/222; F02D 2041/223; F02D 2200/0604; F02M 65/003
USPC .......... 123/479, 688, 690; 73/114.43, 114.51
See application file for complete search history.

(56) References Cited

U.S. PATENT DOCUMENTS

| | | | |
|---|---|---|---|
| 6,053,147 A * | 4/2000 | Hemmerlein | F02D 41/222 123/198 D |
| 6,234,148 B1 | 5/2001 | Hartke et al. | |
| 9,394,845 B2 * | 7/2016 | Stack | F02D 41/222 |
| 2005/0005912 A1 * | 1/2005 | Joos | F02D 41/222 123/458 |
| 2006/0054149 A1 | 3/2006 | Uchiyama | |
| 2009/0082941 A1 * | 3/2009 | Nakata | F02D 41/222 701/103 |
| 2010/0275679 A1 * | 11/2010 | Wang | F02D 41/222 73/114.42 |

(Continued)

FOREIGN PATENT DOCUMENTS

WO 2010050289 A1 5/2010

OTHER PUBLICATIONS

Great Britain Patent Office, Great Britain Search Report for Great Britain Application No. GB1509755.3, dated Nov. 6, 2015.

*Primary Examiner* — Erick Solis
(74) *Attorney, Agent, or Firm* — Lorenz & Kopf LLP

(57) ABSTRACT

A method is disclosed for diagnosing the reliability of a pressure sensor disposed in a fuel rail of an internal combustion engine. A control cycle is executed to measure a value of a fuel rail pressure with the pressure sensor, determine a first and a second threshold value of the fuel rail pressure, identify the measured value of the fuel rail pressure as reliable when the measured value is inside an interval of values ranging from the first threshold value to the second threshold value, and identify the measured value of the fuel rail pressure as unreliable when the measured value is outside that interval. The first and the second threshold values may be determined on the basis of a last reliable value of the fuel rail pressure.

14 Claims, 2 Drawing Sheets

(56) References Cited

U.S. PATENT DOCUMENTS

| | | | |
|---|---|---|---|
| 2011/0016959 A1* | 1/2011 | Hermes | F02D 41/20 73/114.51 |
| 2011/0160981 A1 | 6/2011 | Rieger et al. | |
| 2012/0203422 A1* | 8/2012 | Suda | F02D 41/20 701/30.4 |
| 2013/0124144 A1 | 5/2013 | Hattar et al. | |

* cited by examiner

METHOD OF DIAGNOSING A FUEL RAIL PRESSURE SENSOR

CROSS-REFERENCE TO RELATED APPLICATION

This application claims priority to Great Britain Patent Application No. 1509755.3, filed Jun. 3, 2015, which is incorporated herein by reference in its entirety.

TECHNICAL FIELD

The present disclosure pertains to a method of diagnosing the reliability of a pressure sensor disposed in a fuel rail of an internal combustion engine, particularly an internal combustion engine of a motor vehicle.

BACKGROUND

It is known that an internal combustion engine usually includes a fuel injection system for injecting metered quantities of fuel into the combustion chambers of the engine. The fuel injection system may include a plurality of fuel injectors, each of which is disposed into a corresponding combustion chamber, and a fuel rail in fluid communication with all the fuel injectors. A rail pressure sensor is provided which measures the pressure in the fuel rail.

SUMMARY

The present disclosure provides a strategy for diagnosing the reliability of a fuel rail pressure sensor without using a second pressure sensor. In particular, an embodiment of the present disclosure provides a method of diagnosing reliability of a pressure sensor disposed in a fuel rail of an internal combustion engine, including the execution of a control cycle to measure a value of a fuel rail pressure with the pressure sensor. A first and a second threshold value of the fuel rail pressure are determined with an electronic control unit. The measured value of the fuel rail pressure is indicated as reliable by the electronic control unit when the measured value of the fuel rail pressure is within an interval of values ranging from the first threshold value to the second threshold value. The measured value of the fuel rail pressure is indicated as unreliable by the electronic control unit when the measured value of the fuel rail pressure is outside the interval. The first and the second threshold values are determined on the basis of a last reliable value of the fuel rail pressure.

To this effect, the measured value of the fuel rail pressure is compared, which can be done in a repetitive fashion or even cycle-by-cycle, with a range of values that is adjusted in real time on the basis of the last measured value of the fuel rail pressure to be identified as plausible, thereby providing a reliable criterion for identifying whether the measurement value is reliable. This method provides information on the reliability of the pressure sensor even if there is only exactly one rail pressure sensor available. This avoids the use of a second rail pressure sensor which could provide second measurement values which could be used to check the plausibility of the measurement values of a first rail pressure sensor.

According to an aspect of the disclosure, the first threshold value may be determined by subtracting a first contribution or value from the last reliable value of the fuel rail pressure. This aspect provides a way to determine the first threshold value with a limited computational effort.

In particular, the first contribution may be determined by estimating a minimum fuel quantity that can have entered the fuel rail during the time elapsed since the measurement of the last reliable value of the fuel rail pressure, estimating a maximum fuel quantity that can have exited the fuel rail during the same time, and calculating the first contribution as a function of a difference between the maximum and minimum fuel quantity. This aspect has the effect of yielding a first threshold value, below which the measured value of the fuel rail pressure is certainly not plausible.

More particularly, the minimum fuel quantity can have entered the fuel rail may be estimated to be zero. This aspect represents a case where the flow metering valve of the fuel pump was completely closed during the time elapsed since the measurement of the last reliable value of the fuel rail pressure, which is a precautionary hypothesis for estimating a reliable first contribution.

On the other hand, the maximum fuel quantity that can have exited the fuel rail may be estimated on the basis of electrical signals actuating components provided for regulating the quantity of fuel exiting the fuel rail (e.g. fuel injectors and a pressure regulating valve if present). This aspect is based on the fact that the electric signals operating these components determine how much and/or how long these components remain open. As a consequence, these electric signals actually determine the fuel quantity that globally exits the fuel rail. This fuel quantity is unknown in principle, because it depends on the specific behavior of the components, but it is certainly included between a maximum value and a minimum value which are defined by the production tolerances of the components. Therefore, the maximum fuel quantity exiting the fuel rail may be reliably estimated as the maximum value of the fuel quantity that, according to the production tolerances of the components involved (e.g. the fuel injectors and of the pressure regulating valve if present), can exit the fuel rail considering the current electric signals supplied to these components.

According to another aspect of the disclosure, the second threshold value may be determined by adding a second contribution or value to the last reliable value of the fuel rail pressure. This aspect provides a solution for determining the second threshold value with a limited computational effort.

In particular, the second contribution may be determined by estimating a maximum fuel quantity that can have entered the fuel rail during a time elapsed since the measurement of the last reliable value of the fuel rail pressure, estimating a minimum fuel quantity that can have exited the fuel rail during the same time, and calculating the second contribution as a function of a difference between the maximum and minimum quantity. This aspect has the effect of yielding a second threshold value, above which the measured value of the fuel rail pressure is certainly not plausible.

More particularly, the maximum fuel quantity that can have entered the fuel rail may be estimated on the basis of an electrical signal actuating a component provided for regulating the quantity of fuel entering the fuel rail (e.g. a flow metering valve provided for regulating a volumetric flow rate of fuel delivered by a fuel pump into the fuel rail). This aspect is based on the fact that the electric signal operating this component determines how much the component is open. As a consequence, this electric signal actually determines the fuel quantity that enters the fuel rail. This fuel quantity is unknown in principle, because it depends on the specific behavior of the component, but it is certainly included between a maximum value and a minimum value which are defined by the production tolerances of the component. Therefore, the maximum fuel quantity entering the fuel rail may be reliably estimated as the maximum value of the fuel quantity that according to the production tolerances of the component involved (e.g. the flow metering valve can enter the fuel rail considering the current electric signal supplied to the component.

On the other hand, the minimum fuel quantity that can have exited the fuel rail may be estimated to be zero. This aspect represents a case where all the fuel injectors and the pressure regulating valve were completely closed during a time elapsed since the measurement of the last reliable value of the fuel rail pressure, which is a precautionary hypothesis for estimating a reliable second contribution.

Another aspect of the solution may prescribe that the method with the method steps of at least one embodiment is repeated cyclically or as a sequence of control cycles, e.g. once for a predefined number of revolutions of the crankshaft of the internal combustion engine, or for each revolution. In this way the reliability of the pressure sensor is continuously monitored during the operation of the internal combustion engine.

Another aspect of the solution may prescribe that the method includes the step of identifying a fault of the pressure sensor, if a predetermined number of control cycles identify that the measured value of the fuel rail pressure is unreliable. This aspect of has the effect of providing a reliable criteria for diagnosing that the fuel rail pressure sensor is faulty, without the need of a second redundant sensor.

According to another aspect of the solution, the diagnostic method may further include the step of activating a warning signal, if the fault of the pressure sensor is identified. This aspect has the effect of signaling to the driver of the motor vehicle that the fuel rail pressure sensor is not working properly, so that he/she can drive the motor vehicle to a maintenance center.

The proposed solution may be carried out with the help of a computer program including a program-code for carrying out all the steps of the method described above, and in the form of a computer program product including the computer program. The method can be also embodied as an electromagnetic signal, the signal being modulated to carry a sequence of data bits which represent a computer program to carry out all steps of the method.

Another embodiment of the present disclosure provides an internal combustion engine including a fuel rail, a pressure sensor disposed in the fuel rail and an electronic control unit configured to execute a control cycle including measuring with the pressure sensor a value of a fuel rail pressure, determining a first and a second threshold value of the fuel rail pressure, identifying the measured value of the fuel rail pressure as reliable when the measured value is inside an interval of values ranging from the first threshold value to the second threshold value, and identifying the measured value of the fuel rail pressure as unreliable when the measured value of the fuel rail pressure is outside of that interval. The electronic control unit is configured to determine the first and the second threshold value on the basis of a last reliable value of the fuel rail pressure. This embodiment achieve essentially the same effects of the method above, in particular that of providing a reliable criteria for identifying whether the measurement performed during each single control cycle is reliable or not.

According to an aspect of the solution, the electronic control unit may be configured to determine the first threshold value by subtracting a first contribution from the last reliable value of the fuel rail pressure. This aspect provides a reliable solution for determining the first threshold value with a limited computational effort In particular, the electronic control unit may be configured to determine the first contribution by estimating a minimum fuel quantity that can have entered the fuel rail during the time elapsed since the measurement of the last reliable value of the fuel rail pressure, estimating a maximum fuel quantity that can have exited the fuel rail during the same time, and calculating the first contribution as a function of a difference between the maximum and minimum fuel quantity. This aspect has the effect of yielding a first threshold value, below which the measured value of the fuel rail pressure is certainly not plausible.

More particularly, the electronic control unit may be configured to estimate the minimum fuel quantity that can have entered the fuel rail to be zero. This aspect represents a case where the flow metering valve of the fuel pump was completely closed, which is a precautionary hypothesis for estimating a reliable first contribution.

On the other side, the electronic control unit may be configured to estimate the maximum fuel quantity that can have exited the fuel rail on the basis of electrical signals actuating components provided for regulating the quantity of fuel exiting the fuel rail (e.g. the fuel injectors and the pressure regulating valve if present). This aspect provides an effective solution for estimating the maximum fuel quantity that can have exited the fuel rail.

According to another aspect of the solution, the electronic control unit may be configured to determine the second threshold value by adding a second contribution to the last reliable value of the fuel rail pressure. This aspect provides a reliable solution for determining the second threshold value with a limited computational effort.

In particular, the electronic control unit may be configured to determine the second contribution by estimating a maximum fuel quantity that can have entered the fuel rail during the time elapsed since the measurement of the last reliable value of the fuel rail pressure, estimating a minimum fuel quantity that can have exited the fuel rail during the same time, and calculating the second contribution as a function of a difference between the maximum and minimum quantity. This aspect has the effect of yielding a second threshold value, above which the measured value of the fuel rail pressure is certainly not plausible.

More particularly, the electronic control unit may be configured to estimate the maximum fuel quantity that can have entered the fuel rail on the basis of an electrical signal actuating a component provided for regulating the quantity of fuel entering the fuel rail (e.g. a flow metering valve provided for regulating a volumetric flow rate of fuel delivered by a fuel pump into the fuel rail). This aspect represents an effective solution for estimating the maximum fuel quantity that can have entered the fuel rail.

On the other side, the electronic control unit may be configured to estimate the minimum fuel quantity that can have exited the fuel rail to be zero. This aspect represents a case where all the fuel injectors and the pressure regulating valve were completely closed, which is a precautionary hypothesis for estimating a reliable second contribution.

Another aspect of the solution may prescribe that the electronic control unit is configured to identify a fault of the pressure sensor when a predetermined number of control cycles identify that the measured value of the fuel rail pressure is unreliable. This aspect of has the effect of providing a reliable criteria for diagnosing that the fuel rail pressure sensor is faulty, without the need of a second redundant sensor.

According to another aspect of the solution, the electronic control unit may be configured to activate a warning signal, if the fault of the pressure sensor is identified. This aspect has the effect of signaling to the driver of the motor vehicle that the fuel rail pressure sensor is not working properly, so that he/she can drive the motor vehicle to a maintenance center.

Another aspect of the solution may prescribe that the electronic control unit is configured to repeat the control cycle described above cyclically. In this way the reliability of the pressure sensor is continuously monitored during the operation of the internal combustion engine.

Another embodiment of the present disclosure provides an apparatus for diagnosing reliability of a pressure sensor disposed in a fuel rail of an internal combustion engine, including a processor, electronic control unit or other means to execute a control cycle. The apparatus further includes a sensor, processor, electronic control unit or other means to measure a value of a fuel rail pressure, a processor, electronic control unit or other means determine a first and a second threshold value of the fuel rail pressure, a processor, electronic control unit or other means to identify the measured value of the fuel rail pressure as reliable when the measured value is within an interval of values ranging from the first threshold value to the second threshold value and identify the measured value of the fuel rail pressure as unreliable when the measured value of the fuel rail pressure is outside that interval. The first and the second threshold values may be determined on the basis of a last reliable value of the fuel rail pressure. This embodiment achieve essentially the same effects of the method above, in particular that of providing a reliable criteria for identifying whether the measurement performed during each single control cycle is reliable or not.

According to an aspect of the solution, the first threshold value may be determined by subtracting a first contribution from the value of the last reliable fuel rail pressure. This aspect provides a reliable solution for determining the first threshold value with a limited computational effort.

In particular, the apparatus may include a processor, electronic control unit or other means to estimate a minimum fuel quantity that can have entered the fuel rail during the time elapsed since the measurement of the last reliable value of the fuel rail pressure and a maximum fuel quantity that can have exited the fuel rail during the same time. The apparatus may further include a processor, electronic control unit or other means to calculate the first contribution as a function of a difference between the maximum and minimum fuel quantity. This aspect has the effect of yielding a first threshold value, below which the measured value of the fuel rail pressure is certainly not plausible.

More particularly, the apparatus may be configured to estimate the minimum fuel quantity that can have entered the fuel rail to be zero. This aspect represents a case where the flow metering valve of the fuel pump was completely closed, which is a precautionary hypothesis for estimating a reliable first contribution.

On the other side, the apparatus may be configured to estimate the maximum fuel quantity that can have exited the fuel rail on the basis of electrical signals actuating components provided for regulating the quantity of fuel exiting the fuel rail (e.g. the fuel injectors and the pressure regulating valve if present). This aspect provides an effective solution for estimating the maximum fuel quantity that can have exited the fuel rail.

According to another aspect of the solution, the apparatus may be configured to determine the second threshold value by adding a second contribution to the last reliable value of the fuel rail pressure. This aspect provides a reliable solution for determining the second threshold value with a limited computational effort.

In particular, the apparatus may include a processor, electronic control unit or other means to estimate a maximum fuel quantity that can have entered the fuel rail during the time elapsed since the measurement of the last reliable value of the fuel rail pressure, and estimate a minimum fuel quantity that can have exited the fuel rail during the same time. The apparatus may further include a processor, electronic control unit or other means to calculate the second contribution as a function of a difference between the maximum and minimum quantity. This aspect has the effect of yielding a second threshold value, above which the measured value of the fuel rail pressure is certainly not plausible.

More particularly, the apparatus may be configured to estimate the maximum fuel quantity that can have entered the fuel rail on the basis of an electrical signal actuating a component provided for regulating the quantity of fuel entering the fuel rail (e.g. a flow metering valve provided for regulating a volumetric flow rate of fuel delivered by a fuel pump into the fuel rail). This aspect represents an effective solution for estimating the maximum fuel quantity that can have entered the fuel rail.

On the other side, the apparatus may be configured to estimate the minimum fuel quantity that can have exited the fuel rail to be zero. This aspect represents a case where all the fuel injectors and the pressure regulating valve were completely closed, which is a precautionary hypothesis for estimating a reliable second contribution.

Another aspect of the solution may prescribe that the automotive system includes a processor, electronic control unit or other means to identify a fault of the pressure sensor when a predetermined number of control cycles identify that the measured value of the fuel rail pressure is unreliable. This aspect of has the effect of providing a reliable criteria for diagnosing that the fuel rail pressure sensor is faulty, without the need of a second redundant sensor.

According to another aspect of the solution, the automotive system may further include a processor, electronic control unit or other means to activate a warning signal when the fault of the pressure sensor is identified. This aspect has the effect of signaling to the driver of the motor vehicle that the fuel rail pressure sensor is not working properly, so that he/she can drive the motor vehicle to a maintenance center.

Another aspect of the solution may prescribe that the automotive system includes a processor, electronic control unit or other means to repeat the control cycle described above cyclically. In this way the reliability of the pressure sensor is continuously monitored during the operation of the internal combustion engine.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
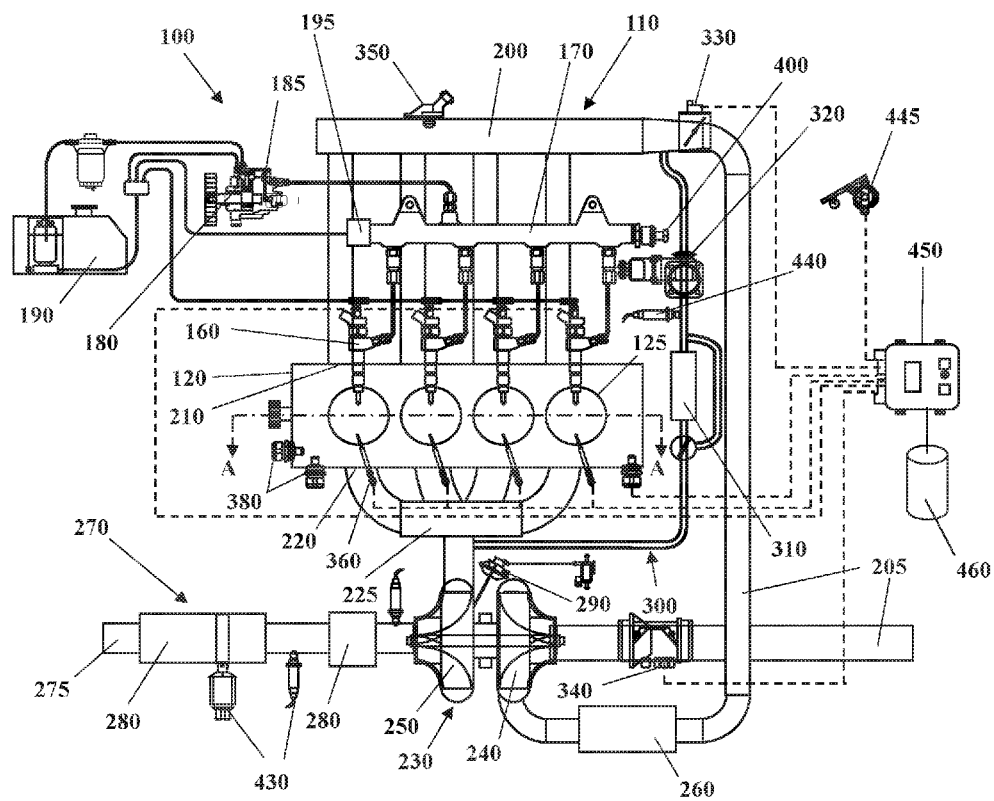
FIG. 1 is a schematic representation of an automotive system according to an embodiment of the present solution.
Figure 2:
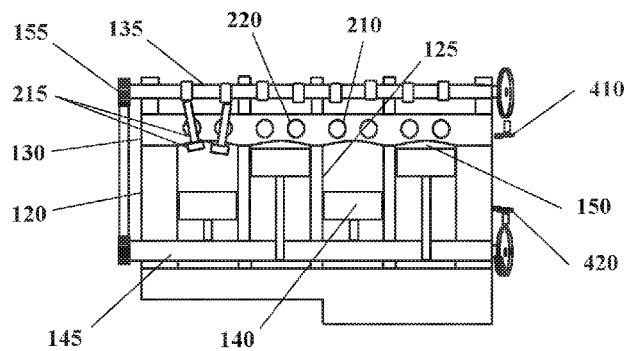
FIG. 2 is the section A-A of the internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. The fuel pump 180 may be equipped with a flow metering valve 185 for adjusting the flow rate of the fuel delivered into the fuel rail 170. A pressure regulating valve 195 may be in fluid communication with the fuel rail 170 to drain part of the fuel back into the fuel source 190, thereby preventing the pressure within the fuel rail 170 to exceed critical values. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust gases exit the turbine 250 and are directed into an exhaust system 270. The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the flow metering valve 185, and the pressure regulating valve 195, the throttle body 330, the EGR Valve 320, the VGT actuator 290, and the cam phaser 155. Note, dashed lines are used to indicate communication between the ECU 450 and the various sensors and devices, but some are omitted for clarity.

More particularly, the ECU 450 may actuate each fuel injector 160 by selectively applying an electric signal, typically an electric current. When the electric current is off, the fuel injector 160 is closed, preventing the fuel from exiting the fuel rail 170. When conversely the electric current is on, the fuel injector 160 moves in an open position, allowing the fuel to exit the fuel rail 170. The quantity of fuel that exits the fuel rail 170 basically depends on how long the fuel injector 160 is kept open, namely on how long the electric current is supplied to it (energizing time). For a given energizing time, the fuel quantity injected by the fuel injector 160 is unknown in principle, because it depends on the real behavior of the fuel injector 160, but it is certainly included between a minimum value and a maximum value which are defined by the production tolerances of this component.

Further, the ECU 450 may actuate the flow metering valve 185 by applying an electric signal, typically an electric current. The intensity of this electric current determines the opening degree of the flow metering valve 185 and accordingly the quantity of fuel that is allowed to enter the fuel rail 170. For a given intensity of the electrical current, the fuel quantity that enters the fuel rail 170 is unknown in principle, because it depends on the real behavior of the flow metering valve 185, but it is certainly included between a minimum value and a maximum value which are defined by the production tolerances of this component.

Similarly, the ECU 450 may actuate the pressure regulating valve 195 by applying an electric signal, typically an electric current. The intensity of this electric current determines the opening degree of the pressure regulating valve 195 and accordingly the quantity of fuel that is allowed to exit the fuel rail 170. For a given intensity of the electrical current, the fuel quantity that exits the fuel rail 170 is unknown in principle, because it depends on the real behavior of the pressure regulating valve 185, but it is certainly included between a minimum value and a maximum value which are defined by the production tolerances of this component.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g., an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
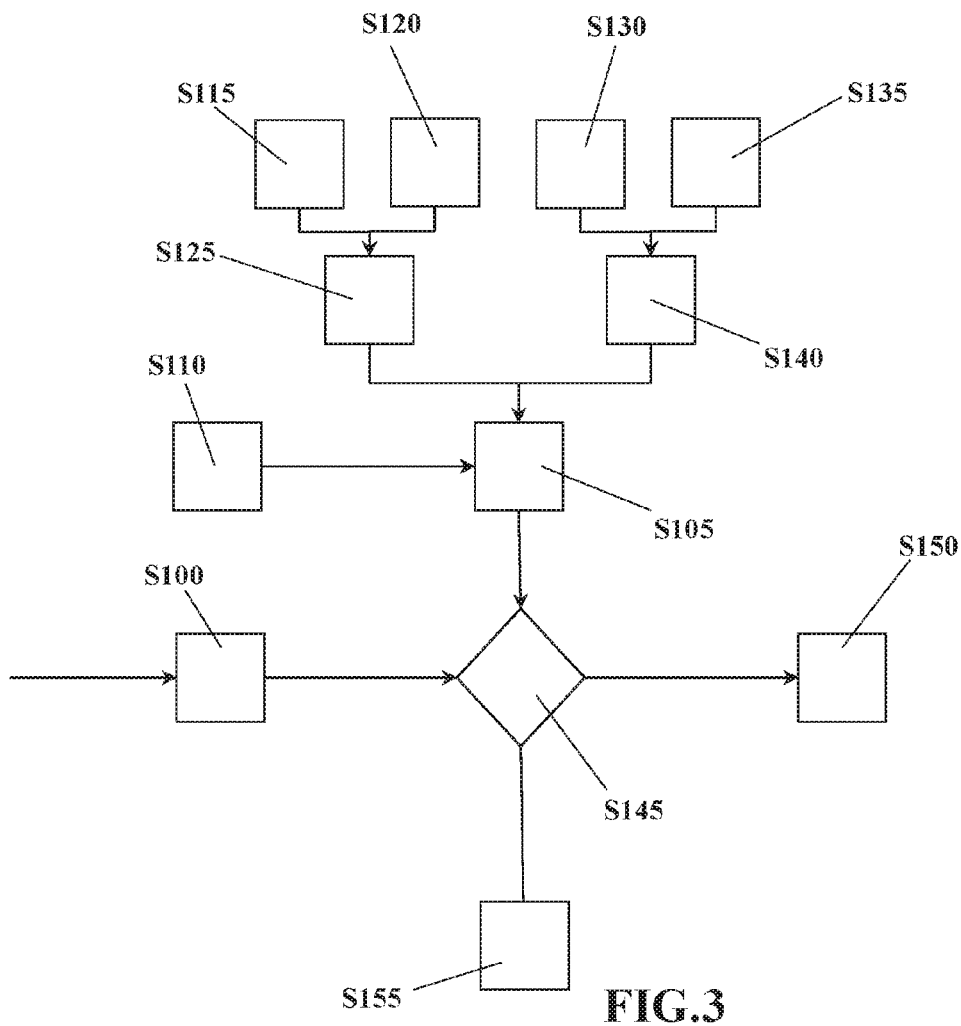
FIG. 3 is a flowchart representing a control cycle to be repeated in order to diagnose the reliability of a fuel rail pressure sensor of the automotive system of FIG. 1.

According to the present disclosure, the ECU 450 may be particularly configured to diagnose the reliability of the fuel rail pressure sensor 400. This diagnosis may provide for the ECU 450 to periodically repeat the control cycle represented in FIG. 3. This control cycle may be repeated at high frequency, for example with a predetermined time period 'T' between two consecutive cycles that may be smaller than 30 ms (milliseconds) or even smaller than 10 ms.

The control cycle generally provides for the ECU 450 to measure (block S100) a current value $P_{(i)}$ of the fuel pressure within the fuel rail 170 (fuel rail pressure) by means of the fuel rail pressure sensor 400, and to identify whether this measured value $P_{(i)}$ is reliable or not. As usual and throughout this disclosure, "i" denotes an index and is an integer number.

To do so, the control cycle may provide for the ECU 450 to determine (block S105) a first threshold value $P_{th1(i)}$ and a second threshold value $P_{th2(i)}$ of the fuel rail pressure, which are valid for the current control cycle (i). The first and the second threshold value $P_{th1(i)}$ and $P_{th2(i)}$ may be calculated by the ECU 450 on the basis of the last value $P_{(i-x)}$ of the fuel rail pressure which has been identified as reliable, during the execution of a preceding control cycle (i-x), x being an integer. By way of example, if the pressure value $P_{(i-1)}$ measured during the last preceding control cycle was identified as reliable, the last reliable value $P_{(i-x)}$ used in the current control cycle is $P_{(i-1)}$. Otherwise, the last reliable value $P_{(i-x)}$ will be $P_{(i-2)}$ or $P_{(i-3)}$ or $P_{(i-4)}$ and so on, depending on which one of them is the last measured value of the fuel rail pressure that has been identified as reliable.

In any case, the value $P_{(i-x)}$ of the fuel rail pressure may be retrieved (block S110) by the ECU 450 from a memory system 460 and updated, at the end of each control cycle, with the measured value $P_{(i)}$ of the fuel rail pressure, provided that such value is acknowledged being reliable.

Knowing the last reliable value $P_{(i-x)}$, the first threshold value $P_{th1(i)}$ may be calculated by the ECU 450 with the step of subtracting a predetermined contribution $S_{(i)}$ from this last reliable value $P_{(i-x)}$ of the fuel rail pressure, according to the following equation:

$$P_{th1(i)} = P_{(i-x)} - S_{(i)}$$

The contribution $S_{(i)}$ represents the maximum pressure drop that can have plausibly occurred within the fuel rail 170 during the period of time that separates the measurement of the current pressure value $P_{(i)}$ and the measurement of the last reliable value $P_{(i-x)}$ of the fuel rail pressure.

In order to determine the contribution $S_i$, the control cycle may provide for the ECU 450 to estimate (block S115) a minimum fuel quantity $mQ_{in(i)}$ that can have entered the fuel rail 170 during the aforementioned period of time, to estimate (block S120) a maximum fuel quantity $MQ_{out(i)}$ that can have exited the fuel rail 170 during the same period of time, and to calculate (block S125) a difference $\Delta 1_{(i)}$ between the maximum and minimum fuel quantity:

$$\Delta 1_{(i)} = MQ_{out(i)} - mQ_{in(i)}$$

In this way, the difference $\Delta 1_{(i)}$ represents the maximum decrement of fuel quantity that can have plausibly occurred within the fuel rail 170 between the execution of the current control cycle (i) and the preceding control cycle (i-x).

The maximum fuel quantity $MQ_{out(i)}$ may be estimated on the basis of the electrical signals that have been used to actuate the fuel injectors 160 and the pressure regulating valve 195 during the period of time that separates the current control cycle (i) and the control cycle (i-x). In particular, the ECU 450 may obtain the intensity of the electrical current supplied to the pressure regulating valve 195 during the time period and, according to the production tolerances of the pressure regulating valve 195, calculate the maximum fuel quantity that can have exited the pressure regulating valve 195 as a function of the length of that period and of the obtained intensity of the electrical current supplied to the valve. The intensity of the electrical current could be the voltage, current, electrical power or the like characterizing the electrical current.

At the same time, the ECU 450 may obtain the energizing time applied to the fuel injectors 160 during the time period that separates the current control cycle (i) and the control cycle (i-x) and, according to the production tolerances of the fuel injectors 160, calculate the maximum fuel quantity that can have been injected by the fuel injectors 160 as a function of the length of that period and of the obtained energizing time.

The maximum fuel quantity $MQ_{out(i)}$ may then be calculated as the sum of the maximum fuel quantity that has exited the pressure regulating valve 195 and the maximum fuel quantity that has been injected by the fuel injectors 160. It should be observed that, in some embodiments, the pressure regulating valve 195 may be absent. In those cases, only the fuel injectors 160 are considered for estimating the maximum fuel quantity $MQ_{out(i)}$.

On the other hand, the minimum fuel quantity $mQ_{in(i)}$ may be estimated on the basis of the electrical signal that have been used to actuate the flow metering valve 185 during the period of time that separates the current control cycle (i) and the preceding control cycle (i-x). In particular, the ECU 450 may obtain the intensity of the electrical current supplied to the flow metering valve during the time period and, according to the production tolerances of the flow metering valve 185, calculate the minimum fuel quantity that can have entered the fuel rail 170 as a function of the length of that period and of on the obtained intensity of the electrical current supplied to the flow metering valve.

However, as precautionary hypotheses, some embodiments may prescribe that the minimum fuel quantity $mQ_{in(i)}$ is estimated to be zero, so that the difference $\Delta 1_{(i)}$ coincides with the maximum fuel quantity $MQ_{out(i)}$ that can have exited the fuel rail 170:

$$\Delta 1_{(i)} = MQ_{out(i)}$$

As a matter of fact, the control cycle disregards in this case the minimum fuel quantity $mQ_{in(i)}$, thereby assuming that the flow metering valve 185 of the fuel pump 180 is completely closed.

In any case, once the difference $\Delta 1_{(i)}$ has been calculated, the ECU 450 may calculate the contribution $S_{(i)}$ using the Bulk modulus' formula:

$$k = -V\frac{dP}{dV}$$

Wherein:
k is the Bulk modulus of the fuel.
V is a volume of the fuel, and
P is a pressure of the fuel.

As a consequence, replacing the difference $\Delta 1_{(i)}$ in the aforementioned equation, it is possible to calculate the contribution $S_{(i)}$ as follows:

$$S_{(i)} = -k\frac{\Delta 1_{(i)}}{V}$$

wherein V is the volume of the fuel within the fuel rail 170, which is the inner volume of the fuel rail.

On the other side, the second threshold value $P_{th2(i)}$ may be calculated by the ECU 450 with the step of adding a predetermined contribution $A_{(i)}$ to the last reliable value $P_{(i-x)}$ of the fuel rail pressure, according to the following equation:

$$P_{th2(i)} = P_{(i-x)} + A_{(i)}$$

The contribution $A_{(i)}$ represents the maximum pressure increment that can have plausibly occurred within the fuel rail 170 during the period of time between the measurement of the current pressure value $P_{(i)}$ and the measurement of the last reliable value $P_{(i-x)}$ of the fuel rail pressure.

In order to determine the contribution $A_{(i)}$, the control cycle may provide for the ECU 450 to estimate (block S130) a maximum fuel quantity $MQ_{in(i)}$ that can have entered the fuel rail 170 during the aforementioned period of time, to estimate (block S135) a minimum fuel quantity $mQ_{out(i)}$ that can have exited the fuel rail 170 during the same period of time, and to calculate (block S140) a difference $\Delta 2_{(i)}$ between the maximum and minimum fuel quantity:

$$\Delta 2_{(i)} = MQ_{in(i)} - mQ_{out(i)}$$

In this way, the difference $\Delta 2_{(i)}$ represents the maximum increment of fuel quantity that can have plausibly occurred within the fuel rail 170 during the time period between the execution of the current control cycle (i) and the preceding control cycle (i-x).

The maximum fuel quantity $MQ_{in(i)}$ may be estimated on the basis of the electrical signal that have been used to actuate the flow metering valve 185 during the period of time that separates the current control cycle (i) and the preceding control cycle (i-x). In particular, the ECU 450 may obtain the intensity of the electrical current supplied to the flow metering valve during the time period and, according to the production tolerances of the flow metering valve 185, calculate the maximum fuel quantity that can have entered the fuel rail 170 as a function of the length of that period and of the obtained intensity of the electrical current supplied to the flow metering valve.

On the other hand, the minimum fuel quantity $mQ_{out(i)}$ may be estimated on the basis of the electrical signals that have been used to actuate the fuel injectors 160 and the pressure regulating valve 195 during the period of time that separates the current control cycle (i) and the control cycle (i-x). In particular, the ECU 450 may obtain the intensity of the electrical current supplied to the pressure regulating valve 195 during the time period and, according to the production tolerances of the pressure regulating valve 195, calculate the minimum fuel quantity that can have exited the pressure regulating valve 195 as a function of the length of that period and of the obtained intensity of the electrical current supplied to the valve.

At the same time, the ECU 450 may obtain the energizing time applied to the fuel injectors 160 during the time period that separates the current control cycle (i) and the control cycle (i-x) and, according to the production tolerances of the fuel injectors 160, calculate the minimum fuel quantity that can have been injected by the fuel injectors 160 as a function of the length of that period and of the obtained energizing time.

The minimum fuel quantity $mQ_{out(i)}$ may be calculated as the sum the minimum fuel quantity that has exited the pressure regulating valve 195 and the minimum fuel quantity that has been injected by the fuel injectors 160. It should be observed that, in some embodiments, the pressure regulating valve 195 may be absent. In those cases, only the fuel injectors 160 are considered to estimate the maximum fuel quantity $mQ_{out(i)}$.

However, as precautionary hypotheses, some embodiments may prescribes that the minimum fuel quantity $mQ_{out(i)}$ is estimated to be zero, so that the difference $\Delta 2_{(i)}$ coincides with the maximum fuel quantity $MQ_{in(i)}$ that can have entered the fuel rail 170:

$$\Delta 2_{(i)} = MQ_{in(i)}$$

As a matter of fact, the control cycle disregards in this case the minimum fuel quantity $mQ_{out(i)}$ and assumes that all the outlets of the fuel rail 170 (e.g. all the fuel injectors 160 and the pressure regulating valve 195) were completely closed.

In any case, once the difference $\Delta 2_{(i)}$ has been calculated, the ECU 450 may calculate the contribution $A_{(i)}$ using the Bulk modulus' formula:

$$k = -V\frac{dP}{dV}$$

Wherein:
k is the Bulk modulus of the fuel,
V is the volume of the fuel, and
P is the pressure of the fuel.

As a consequence, replacing the difference $\Delta 2_{(i)}$ in the aforementioned equation, it is possible to calculate the contribution $A_{(i)}$ as follows:

$$A_{(i)} = -k\frac{\Delta 2_{(i)}}{V}$$

wherein V is the volume of the fuel within the fuel rail 170, which is the inner volume of the fuel rail 170.

Once the threshold values $P_{th1(i)}$ and $P_{th2(i)}$ have been calculated, the control cycle provides for the ECU 450 to compare them with the current value $P_{(i)}$ of the fuel pressure as measured by the fuel rail pressure sensor 400 (block S145). If the current value $P_{(i)}$ is included in the interval of values ranging from $P_{th1(i)}$ and $P_{th2(i)}$, this means that the measurement made by the fuel rail pressure sensor 400 is reliable (block S150). If conversely if the current value $P_{(i)}$ is outside of the interval of values ranging from $P_{th1(i)}$ and $P_{th2(i)}$, this means that the measurement made by the fuel rail pressure sensor 400 is unreliable (block S155).

The control cycle described above is periodically repeated and, as soon as a predetermined number of control cycles identify that the measured value $P_{(i)}$ of the fuel rail pressure is unreliable, the ECU 450 may identify a fault of the fuel rail pressure sensor 400. By way of example, the predetermined number of control cycle may be just one. In this case, the first time that a control cycle identifies an unreliable measured value $P_{(i)}$ of the fuel rail pressure, the ECU 450 identifies the fault of the fuel rail pressure sensor 400. However, in order to improve the robustness of the diagnostic strategy, other embodiments may prescribe that the predetermined number of control cycle necessary to identify the fault is greater than one in this case, the number of control cycles may refer to a number of consecutive control cycles, or it may refer to a number of control cycles not necessarily consecutive but within a predetermined time windows (e.g. 5 negative control cycles within a windows of 10 control cycles). In any case, the prescribed number of control cycles may be a calibration parameter that may be determined with an experimental activity.

If (or when) a fault of the fuel rail pressure sensor 400 has been identified, the ECU 450 may be configured to activate a warning signal, for example a light in a dashboard, that informs the driver of the automotive system 100 about the need of a maintenance intervention. In addition or in the alternative, the ECU may limit the maximum speed of the vehicle to force the driver to drive to a maintenance center.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of diagnosing reliability of a pressure sensor disposed in a fuel rail of an internal combustion engine, the method comprising:
   measuring a value of a fuel rail pressure with the pressure sensor;
   determining a first and a second threshold value of the fuel rail pressure, wherein the first and the second threshold values are determined on the basis of a last reliable value of the fuel rail pressure;
   identifying the measured value of the fuel rail pressure as reliable when said measured value is within an interval of values ranging from the first threshold value to the second threshold value; and
   identifying the measured value of the fuel rail pressure as unreliable when said measured value is outside that interval.

2. The method according to claim 1, further comprising determining the first threshold by subtracting a first contribution from the last reliable value of the fuel rail pressure.

3. The method according to claim 2, further comprising:
   estimating a minimum fuel quantity entering the fuel rail during an elapsed time since the measurement of the last reliable value of the fuel rail pressure;
   estimating a maximum fuel quantity exiting the fuel rail during the elapsed time; and
   calculating the first contribution as a function of a difference between said maximum and minimum fuel quantity.

4. The method according to claim 3, further comprising estimating the minimum fuel quantity entering the fuel rail to be zero.

5. The method according to claim 3, further comprising estimating the maximum fuel quantity exiting the fuel rail on the basis of an electrical signal actuating a component provided for regulating the quantity of fuel exiting the fuel rail.

6. The method according to claim 1, further comprising determining the second threshold value by adding a second contribution to the last reliable value of the fuel rail pressure.

7. The method according to claim 6, further comprising:
   estimating a maximum fuel quantity entering the fuel rail during an elapsed time since the measurement of the last reliable value of the fuel rail pressure;
   estimating a minimum fuel quantity exiting the fuel rail during the elapsed time; and
   calculating the second contribution as a function of a difference between said maximum and minimum quantity.

8. The method according to claim 7, further comprising estimating the maximum quantity entering the fuel rail on the basis of an electrical signal actuating a component provided for regulating the quantity of fuel entering the fuel rail.

9. The method according to claim 7, further comprising estimating the minimum fuel quantity exiting the fuel rail to be zero.

10. The method according to claim 1, wherein the method is carried out cyclically as a sequence of control cycles.

11. The method according to claim 10, further comprising identifying a fault of the pressure sensor when a predetermined number of control cycles indicate that the measured value of the fuel rail pressure is unreliable.

12. The method according to claim 1, further comprising activating a warning signal when a fault of the pressure sensor is identified.

13. A non-transitory computer readable medium comprising a program-code which when executed on a computer executed the method of diagnosing reliability of a pressure sensor disposed in a fuel rail of an internal combustion engine according to claim 1.

14. An internal combustion engine comprising:
a fuel rail;
a pressure sensor disposed in the fuel rail; and
an electronic control unit configured to execute a control cycle including:
 measuring a value of a fuel rail pressure with the pressure sensor;
 determining a first and a second threshold value of the fuel rail pressure, wherein the first and the second threshold values are determined on the basis of a last reliable value of the fuel rail pressure;
 identifying the measured value of the fuel rail pressure as reliable when said measured value is within an interval of values ranging from the first threshold value to the second threshold value; and
 identifying the measured value of the fuel rail pressure as unreliable when said measured value is outside that interval.

* * * * *